July 28, 1964  V. K. McHUGH  3,142,508
PORTABLE SUN-GLARE VISOR
Filed July 13, 1962
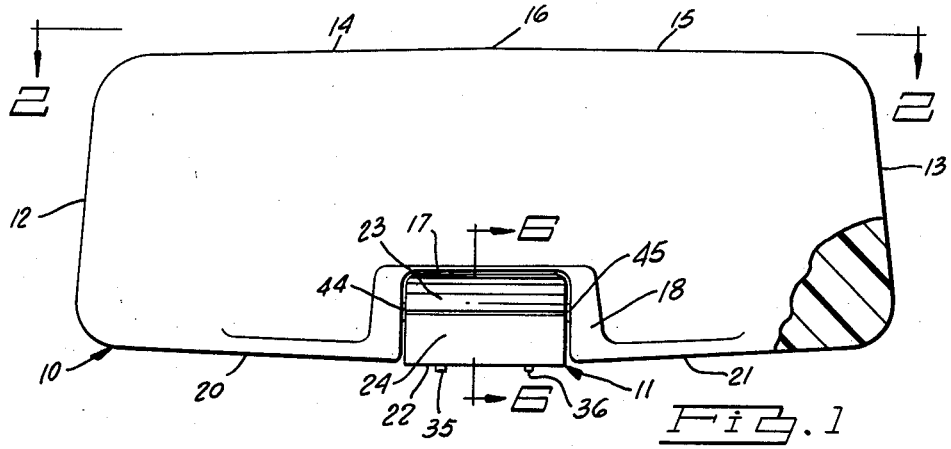
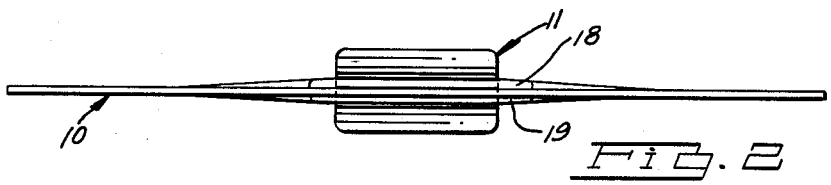
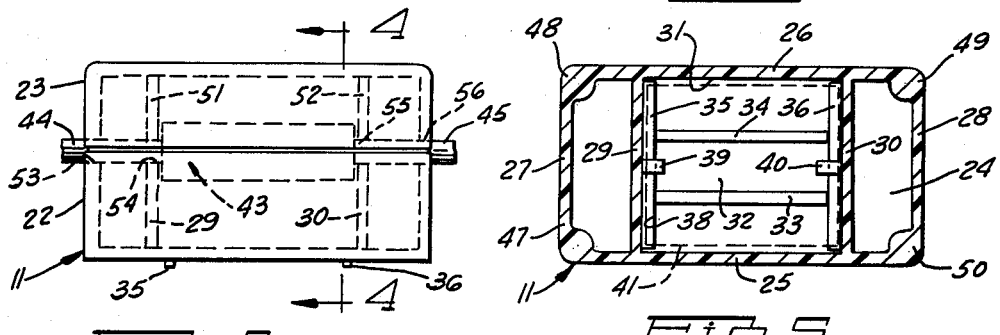
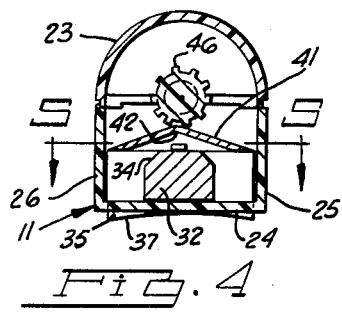
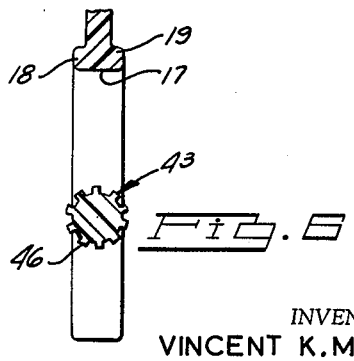
INVENTOR.
VINCENT K. McHUGH
BY Donnelly, Mentag & Harrington
ATTORNEYS

United States Patent Office 3,142,508
Patented July 28, 1964

---

3,142,508
PORTABLE SUN-GLARE VISOR
Vincent K. McHugh, 16563 Plainview, Detroit, Mich.
Filed July 13, 1962, Ser. No. 209,668
2 Claims. (Cl. 296—97)

This invention relates generally to sun visors, and more particularly, to a portable sun visor adapted to be used for blocking the direct rays of the sun or the glare of the sun shining on a polished surface such as the engine hood of an automobile. The usual sun visor in an automobile shields the eyes of a person riding in the front seat of an automobile from the direct rays of the sun but such visors do not shield a person from the glare from the engine hood of the automobile caused by the sun shining on the polished engine hood. The glare of the sun from the front portion of an automobile is annoying to a person riding in the front seat of an automobile and it is also not conducive to good driving vision. Accordingly, it is the primary object of the present invention to provide a portable sun glare shield which may be releasably secured to the dash board of an automobile without requiring a permanent installation means and which may be quickly and easily moved about to different positions to shield the eyes of a rider in the automobile, depending upon the location of the sun and the position of the rider in the automobile.

It is another object of the present invention to provide a portable sun glare shield or visor which may be releasably secured to the dashboard of an automobile for blocking the glare from the automobile engine hood, or which may be releasably secured in various positions about the automobile window frames to block the direct rays of the sun.

It is a further object of the present invention to provide a novel and portable sun glare visor which is simple of construction, has a minimum number of parts and is economical to manufacture.

It is another object of the present invention to provide a novel and improved portable sun visor which provides a base member having a shield member adjustably mounted thereon and which base member is provided with permanent magnet means for securing the visor on the dashboard of a vehicle or to the metal frames of a vehicle.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a front elevational view of a portable sun glare visor made in accordance with the principle of the present invention;

FIG. 2 is a top view of the structure illustrated in FIG. 1, taken along the line 2—2 thereof and looking in the direction of the arrows;

FIG. 3 is an enlarged, fragmentary view of the visor base structure illustrated in FIG. 1;

FIG. 4 is an elevational, sectional view of the structure illustrated in FIG. 3, taken along the line 4—4 thereof, looking in the direction of the arrows, and with the spring plate removed;

FIG. 5 is a slightly enlarged, horizontal, sectional view of the structure illustrated in FIG. 4, taken along the line 5—5 thereof and looking in the direction of the arrows; and FIG. 6 is a fragmentary, enlarged, elevational, sectional view of the structure illustrated in FIG. 1, taken along the line 6—6 thereof, looking in the direction of the arrows, and with the base portion removed.

Referring now to the drawings and in particular to FIGS. 1, 2 and 3, the numeral 10 generally indicates a shield or visor made from a non-transparent material as plastic or the like. The numeral 11 generally indicates a base member upon which the visor member 10 is adjustably mounted for releasable attachment to the dashboard or other metallic member in a vehicle or the like. As shown in FIGS. 1 and 2, the visor 10 substantially is rectangular in overall plan configuration and is provided with rounded corners. The side edges of the visor 10 taper upwardly and inwardly as indicated by the numerals 12 and 13. The upper edge of the visor 10 tapers upwardly and inwardly from the outer side thereof to the central apex or high point 16. The visor 10 is provided with a central recess 17 in the lower side thereof in which is seated the base member 11. The recess 17 is provided with a reinforcing rib 18 around the outer edges thereof on one side of the visor 10 and a similar reinforcing rib 19 is provided on the other side of the visor 10. The reinforcing ribs or portions 18 and 19 extend outwardly along the bottom edges 20 and 21, as shown in FIG. 1. The lower edges 20 and 21 taper downwardly and inwardly toward the recess 17. The lower tapered edges 20 and 21 of the visor 10 are disposed slightly above the lower surface 22 of the base member 11. The reinforcing ribs 18 and 19 are preferably formed integral with the other portion of the visor 10. As shown in FIG. 2, the visor is substantially equal in cross section throughout the entire visor with the exception of the reinforcing ribs 18 and 19.

The base member 11 includes the lower housing 22 and the upper housing 23. The lower housing is rectangularly shaped, in horizontal cross section, and includes the bottom wall 24, the vertical, spaced apart, integral front and rear walls 25 and 26, and the vertical integral end walls 27 and 28. The lower housing 22 includes the transverse, integral vertical walls 29 and 30 which are spaced inwardly from the end walls 27 and 28, respectively.

The area between the inwardly disposed transverse walls 29 and 30 is indicated by the numeral 31 and forms a compartment for a permanent magnet releasable holding means which holds the base member 11 in place on a metallic surface. The permanent magnet releasable holding means comprises the permanent magnet 32 which has the upper chamfered edges 33 and 34. Mounted at each end of the permanent magnet 32 is a steel plate or mounting leg as 35 and 36. As shown in FIGS. 4 and 5, the steel plate mounting leg 35 is provided with a curved lower end surface 37 which extends downwardly through the transverse slot 38. The mounting leg 35 is provided with the flange 39 on the upper end thereof which is adapted to overlay the upper side of the permanent magnet 32. The other mounting leg 36 is also provided with a similar lower curved end, and with the flange 40 on the upper end thereof. The mounting legs 35 and 36 are formed from a suitable metal whereby when the base member 11 is disposed on a metallic surface, the permanent magnet 32 will act through the metallic legs 35 and 36 and releasably hold the visor on the metallic surface.

As shown in FIG. 4, a spring plate 41 is mounted on top of the mounting legs 35 and 36. The spring plate 41 is formed in cross section as an inverted V, and the apex 42 thereof is disposed longitudinally along the center line of the lower housing portion 22. The spring plate 41 extends between the side walls 25 and 26 and the intermediate transverse walls 29 and 30.

As shown in FIGS. 1, 3 and 4, the visor or shield 10 is provided with the horizontally disposed longitudinally extended gear generally indicated by the numeral 43. The gear 43 is integrally connected by means of the shafts 44 and 45 to the visor 10 in a position spanning the recess 17. As shown in FIGS. 4 and 6, the gear 43 is provided with a plurality of peripherally spaced apart longitudinally extended teeth 46. The gear 43 is adapted to be disposed within the lower housing 22 and is adapted to engage the apex 42 of the spring plate 41. The apex 42 is adapted to extend upwardly into the space between the adjacent gear teeth 43 so as to prevent rotation of the gear 43.

The upper housing 23 is adapted to be seated on top of the lower housing 22 and to be secured thereto by any suitable means. The upper and lower housings 22 and 23 are preferably made from a suitable plastic and joined together by adhesives mounted on the mating edges of the housings, and in particular by adhesive mounted on the enlarged corner joining spots 47, 48, 49 and 50, as shown in FIG. 5. As shown in FIG. 3, the upper housing 23 is also provided with transverse intermediate walls 51 and 52, which are aligned with the intermediate walls 29 and 30 in the lower housing. The gear shaft 44 is adapted to be mounted in a suitable general hole formed in the mating end walls of the lower and upper housing 22 and 23 as indicated by the numeral 53. The gear shaft 44 is further journalled in a similar hole 54 formed in the housing walls 29 and 51. The other shaft 45 for supporting the gear 43 is also journalled in suitable holes 55 and 56 formed in the housing walls on the other end of the upper and lower housing 22 and 23 as indicated in FIG. 3.

It will be recognized that the visor of the present invention may be placed in any desired location on any metallic surface without damaging or marring the surface. The sun visor would be placed on the dashboard of a vehicle such as an automobile, a truck, a bus and the like, as well as on boats and aircraft. The magnetic effect produced by the permanent magnet 32 will make the mounting legs 35 and 36 grip a metallic surface yet permit the visor to be quickly and easily detached therefrom and moved to a new location. The visor 10 may be adjusted to any desired position by merely grasping the same and rotating it relative to the base member 11. The visor may be adjusted relative to the base member 11 because the gear teeth 46 may be moved over the apex 42 of the spring plate 41 by merely exerting a slight force on the visor 10. The spring plate 41 will flex downwardly slightly to permit a gear tooth 46 to pass thereover and it will spring upwardly after a gear tooth has passed thereover to permit the apex 42 to again enter the next adjacent recess to hold the visor in the slightly adjusted position. It will be understood that the spring plate 41 has a slight clearance within the chamber 31 to permit the slight flexing movement of the same to permit the gear 43 to be rotated. Experience has shown that the visor of the present invention is a useful and efficient visor for shielding either the direct rays of the sun or the glare of the sun from the engine hood of a vehicle, or the like.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A sun visor comprising: a housing; a permanent magnet means mounted in said housing on the lower side thereof for releasably securing the same to a metallic supporting surface; a shield member having an inwardly extended substantially rectangular recess formed on its lower end; said housing being disposed in said recess; a horizontally disposed, integrally formed shaft on said shield member on each side of said recess and extending into said recess; said shafts being horizontally aligned and rotatably mounted in the upper end of said housing; a horizontally disposed gear member fixedly supported by said shafts and being disposed within the upper end of said housing; said gear member having a plurality of longitudinally extended circumferentially disposed gear teeth; a spring plate mounted in said housing and engageable with said gear teeth to retain the shield member in an adjusted position relative to said housing, and said spring plate being flexible to permit the shield member to be rotated to move the gear teeth over the spring plate to move the shield member to adjusted positions relative to said housing.

2. A sun visor comprising: a housing; releasable holding means carried in the lower part of said housing for releasably securing the same to a metallic supporting surface; a shield member having a recess formed on its lower end; said housing being disposed in said recess; mounting means for swingably mounting said shield on said housing; said mounting means comprising a horizontally disposed gear on said shield member and having a plurality of circumferentially disposed teeth, said horizontally disposed gear being extended within the housing, an inverted V-shaped spring plate mounted in said housing and having the point of the V-shaped plate engageable with said gear teeth to retain the shield member in an adjusted position, and said spring plate being flexible to permit the shield member to be rotated to move the gear teeth over the point of the spring plate to move the shield member to a new adjusted position.

References Cited in the file of this patent
UNITED STATES PATENTS

| | | |
|---|---|---|
| 1,815,411 | Lewis | July 21, 1916 |
| 1,383,668 | Smith | July 5, 1921 |
| 2,410,171 | Le Lande | Oct. 29, 1946 |
| 2,453,488 | Bowen | Nov. 9, 1948 |
| 2,875,324 | Camp | Feb. 24, 1959 |
| 2,888,617 | Baumet | May 26, 1959 |
| 3,022,109 | Hauskama | Feb. 20, 1962 |
| 3,036,476 | Klepper | May 29, 1962 |